July 27, 1954

S. J. LEWIS 2,684,800

MACHINE FOR INSERTING CONTAINERS OR BOTTLES
IN CASES, CRATES, OR CARTONS

Filed Dec. 16, 1950

Inventor
STEPHEN J. LEWIS

By Curtis, Morris & Safford
Attorneys

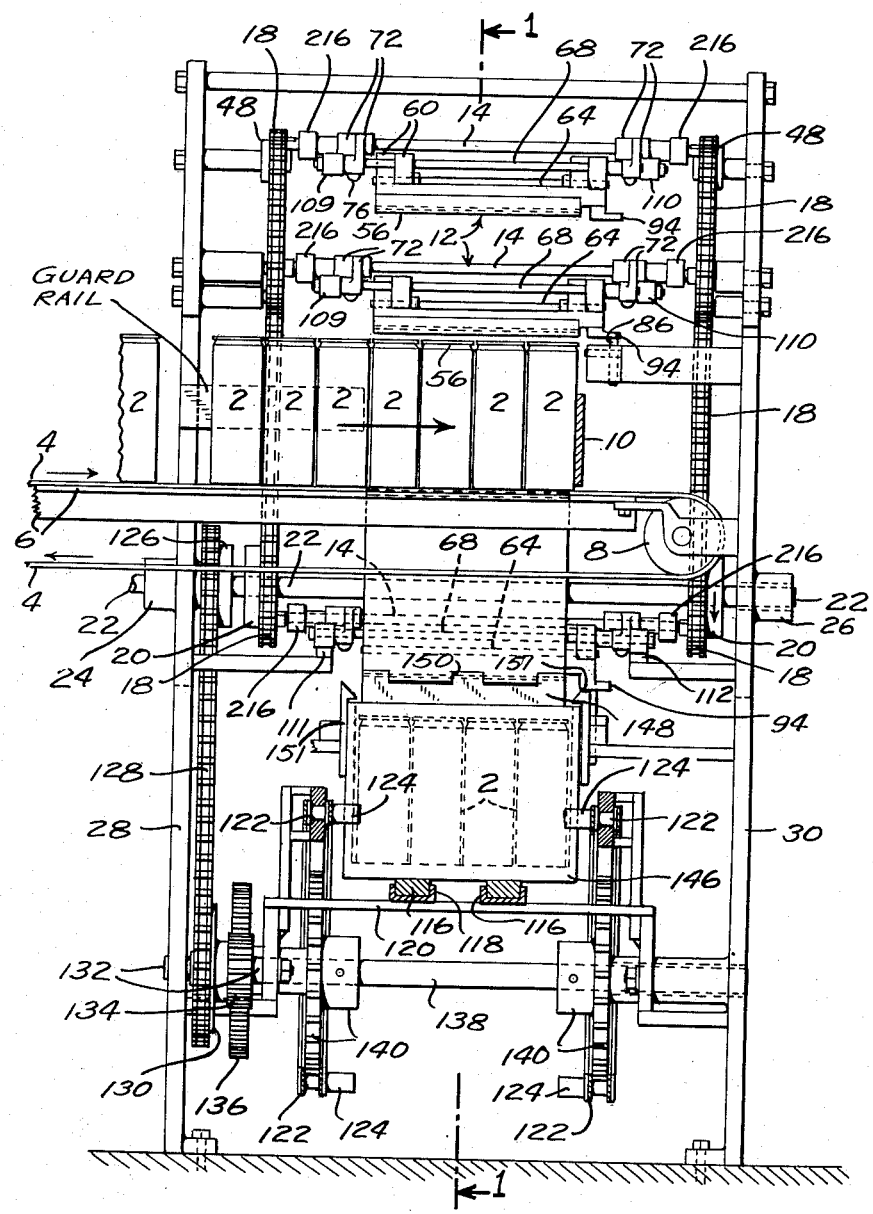

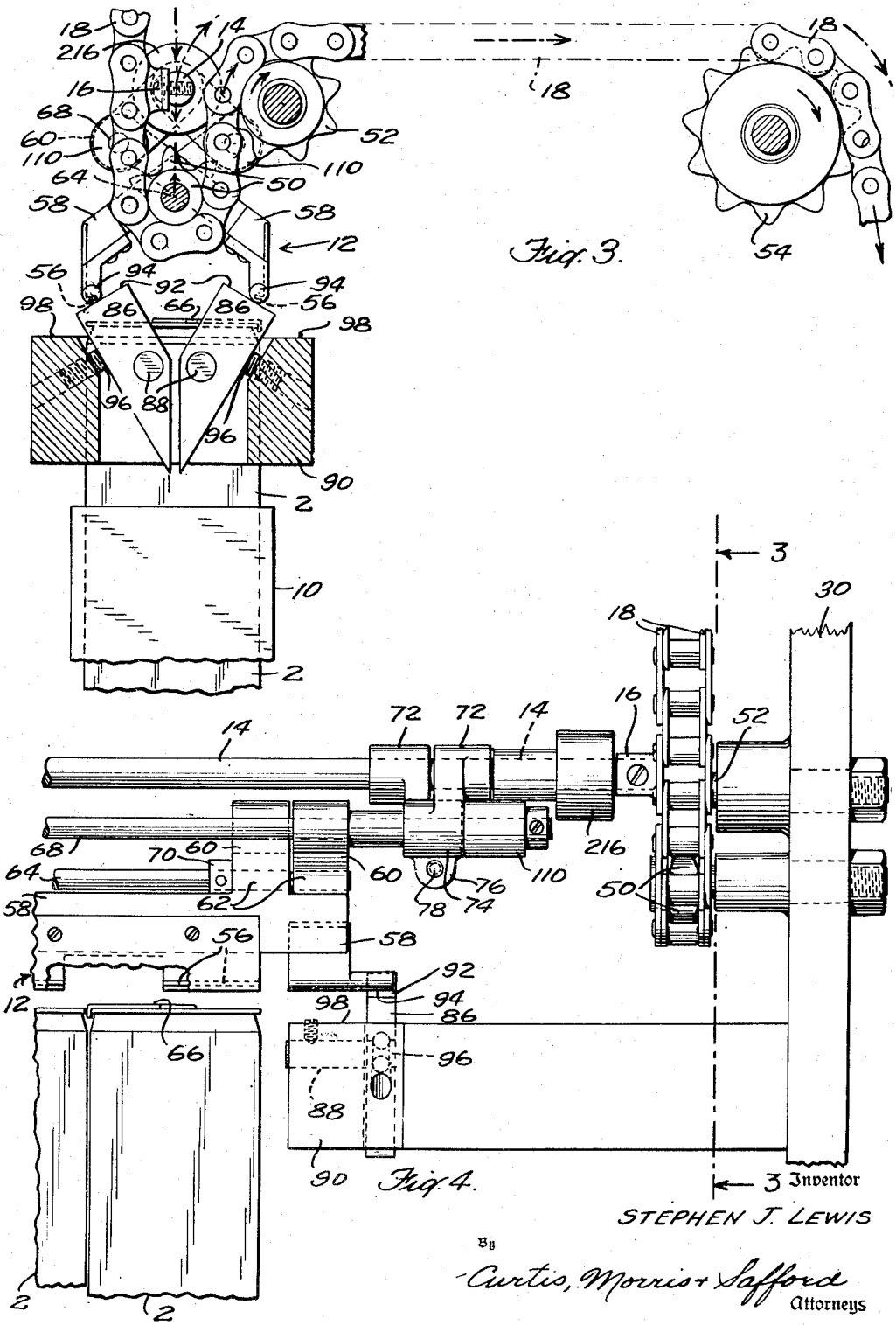

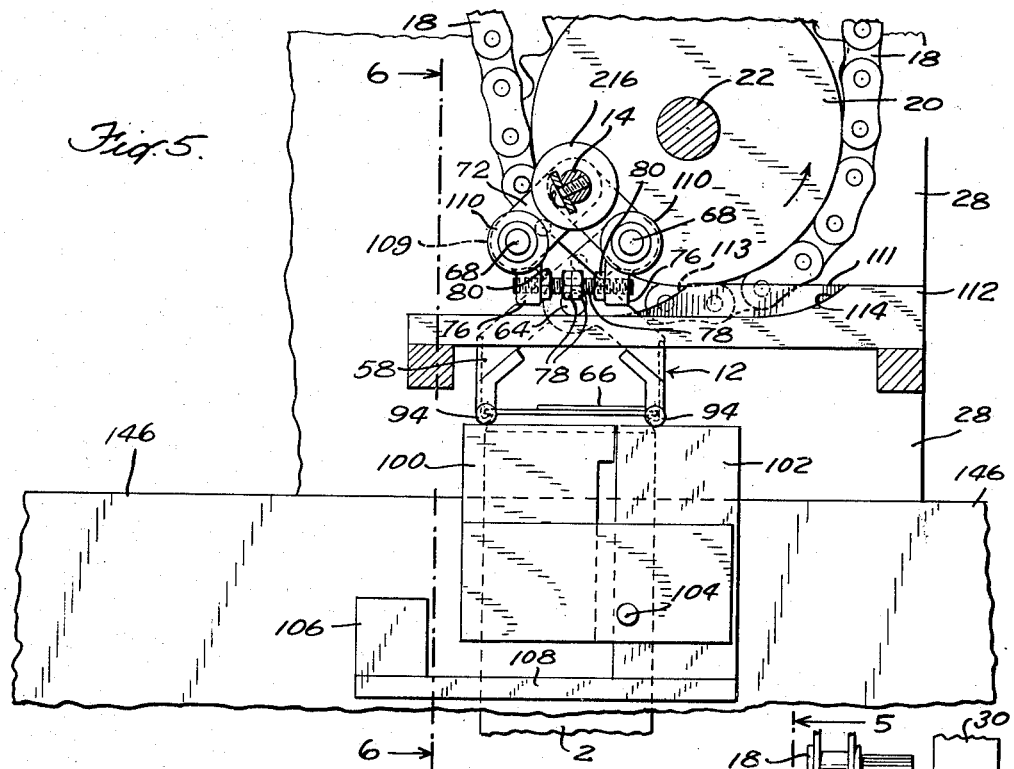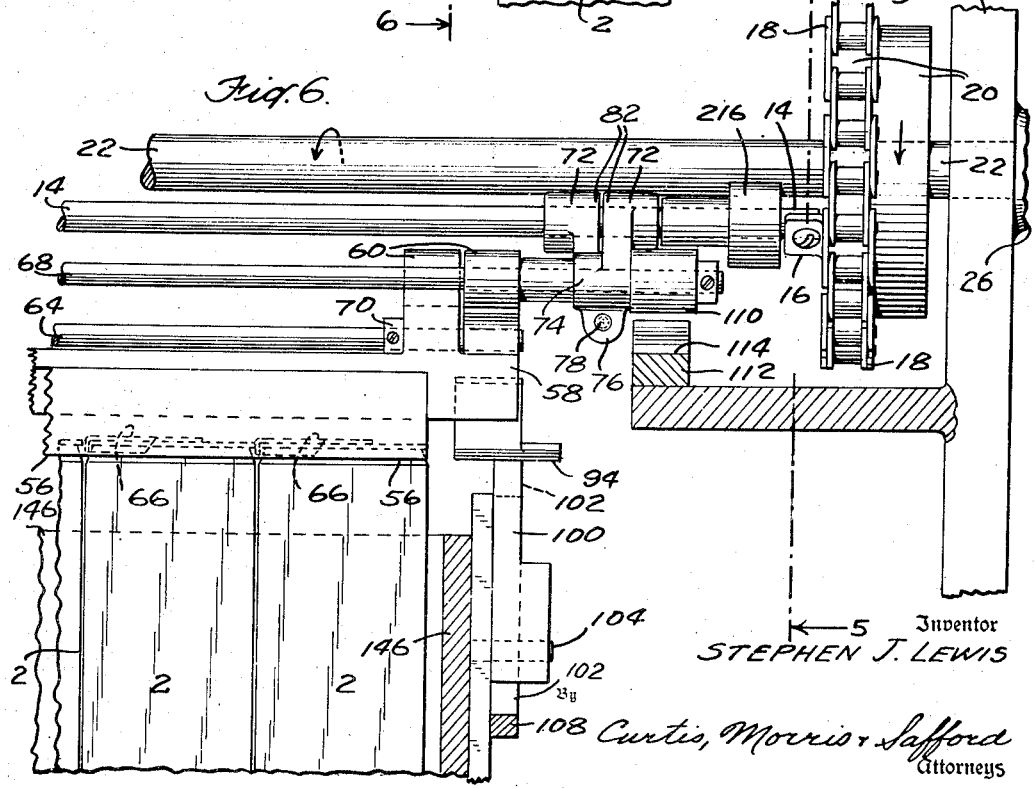

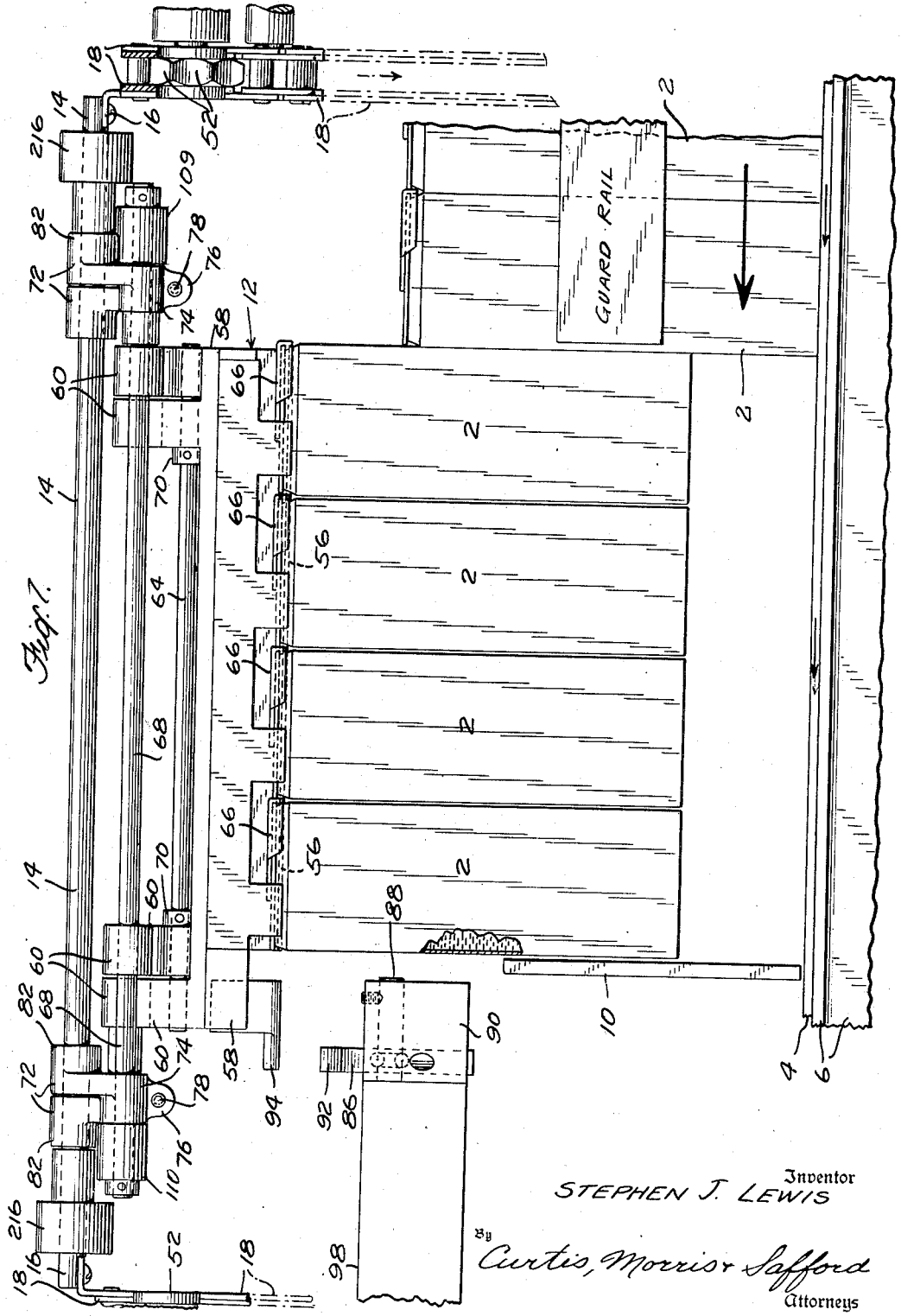

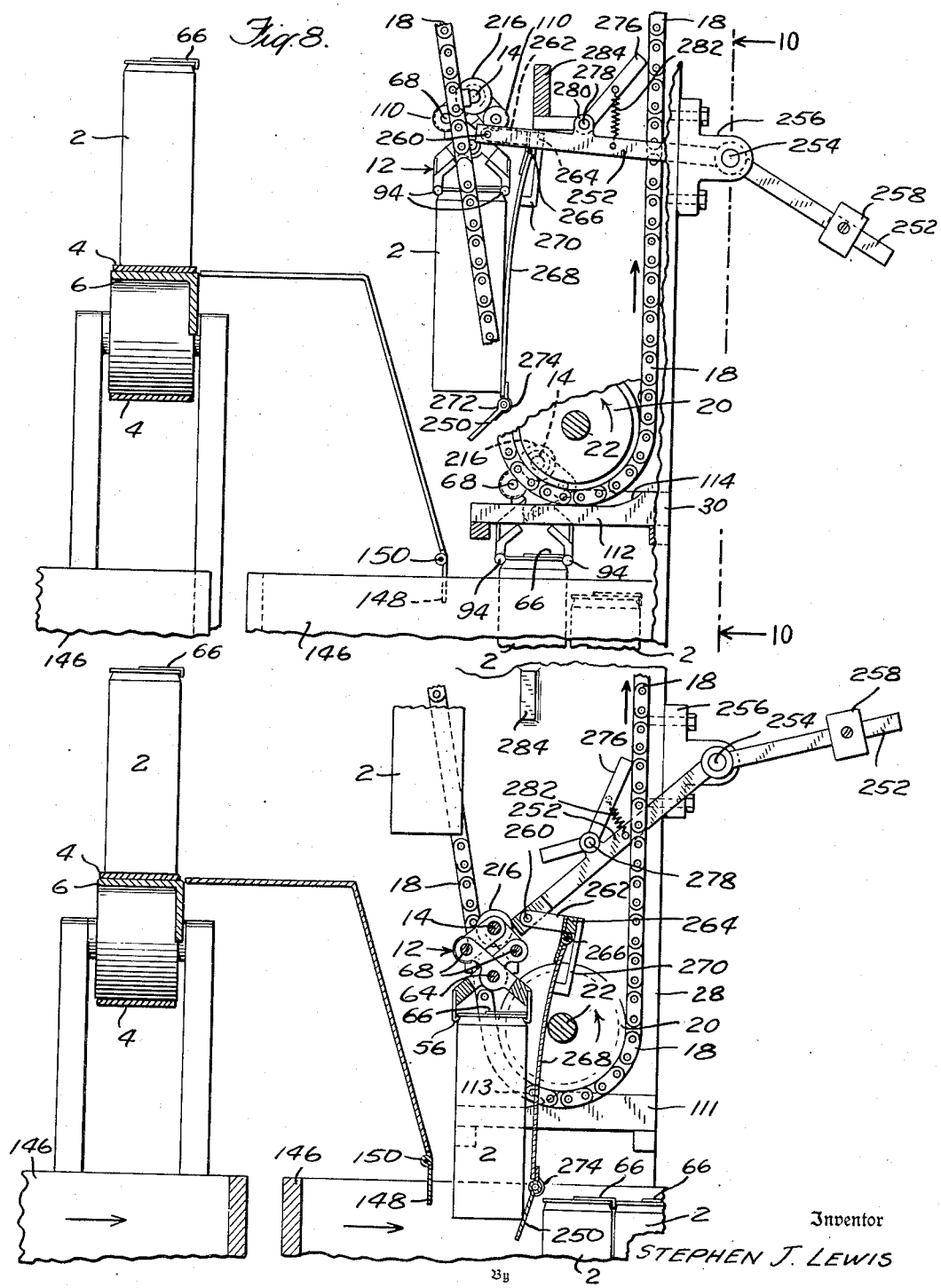

July 27, 1954
S. J. LEWIS
2,684,800
MACHINE FOR INSERTING CONTAINERS OR BOTTLES
IN CASES, CRATES, OR CARTONS
Filed Dec. 16, 1950
11 Sheets-Sheet 7
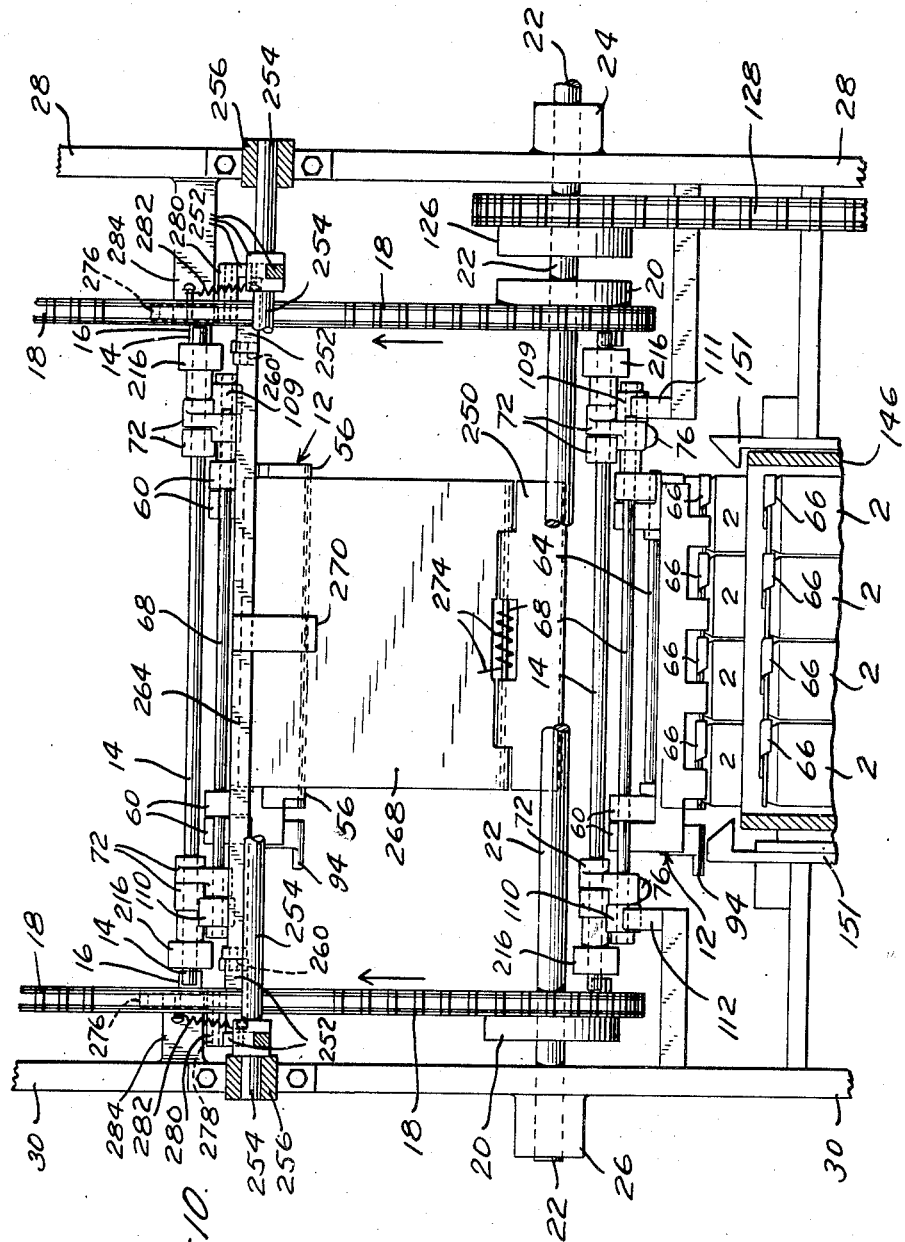
Inventor
STEPHEN J. LEWIS
By
Curtis, Morris & Safford
Attorneys Inventor
STEPHEN J. LEWIS
By Curtis, Morris & Safford
Attorneys

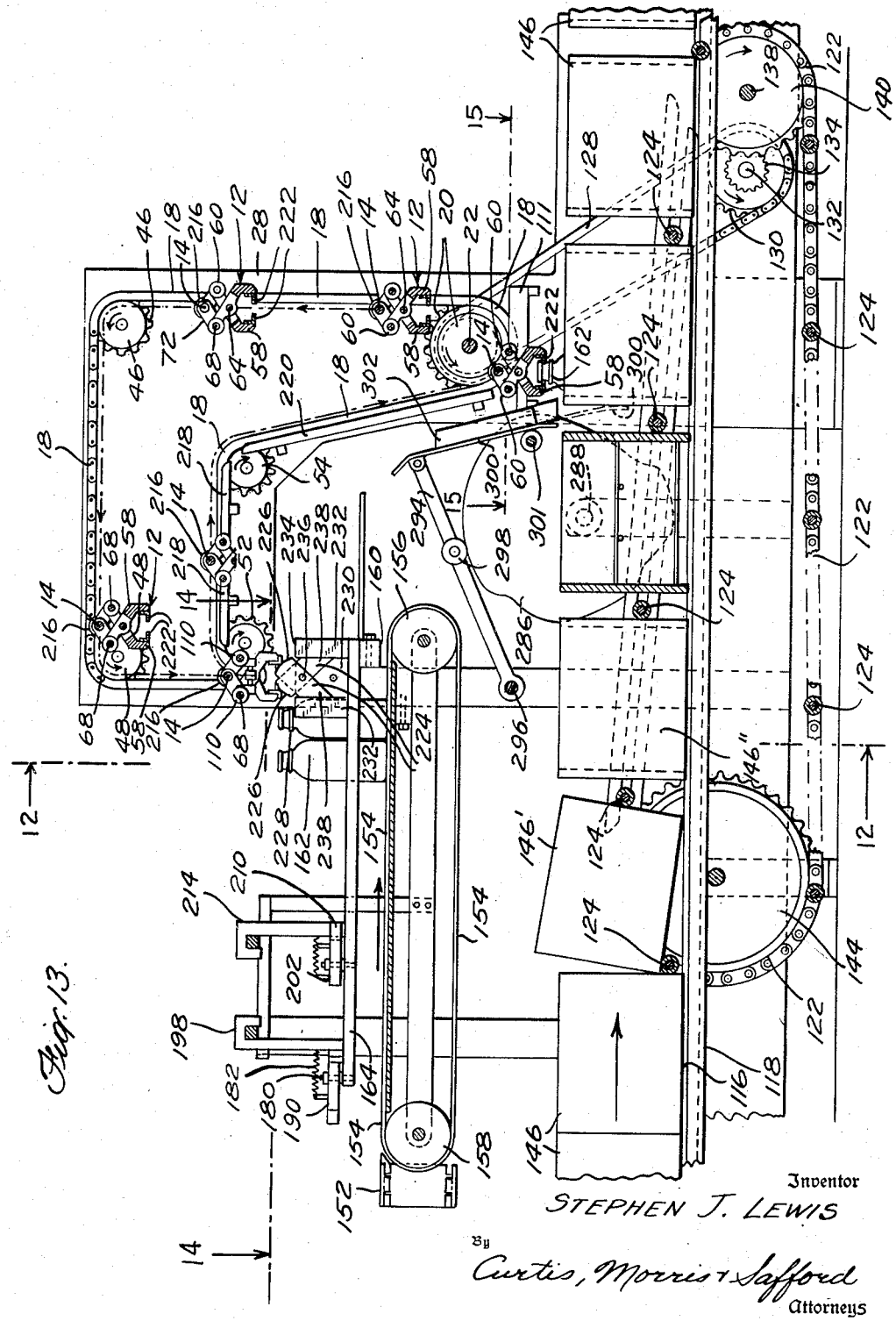

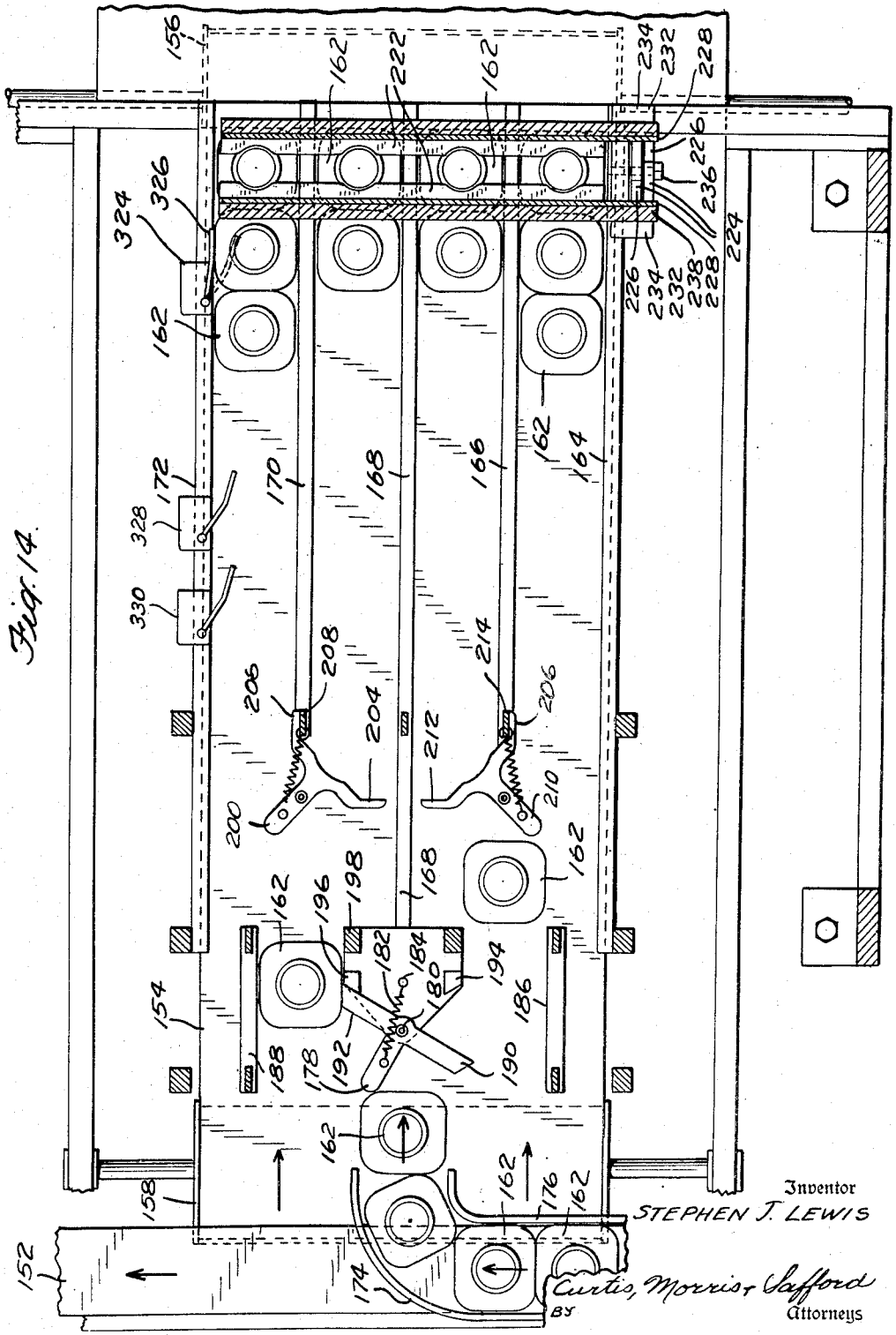

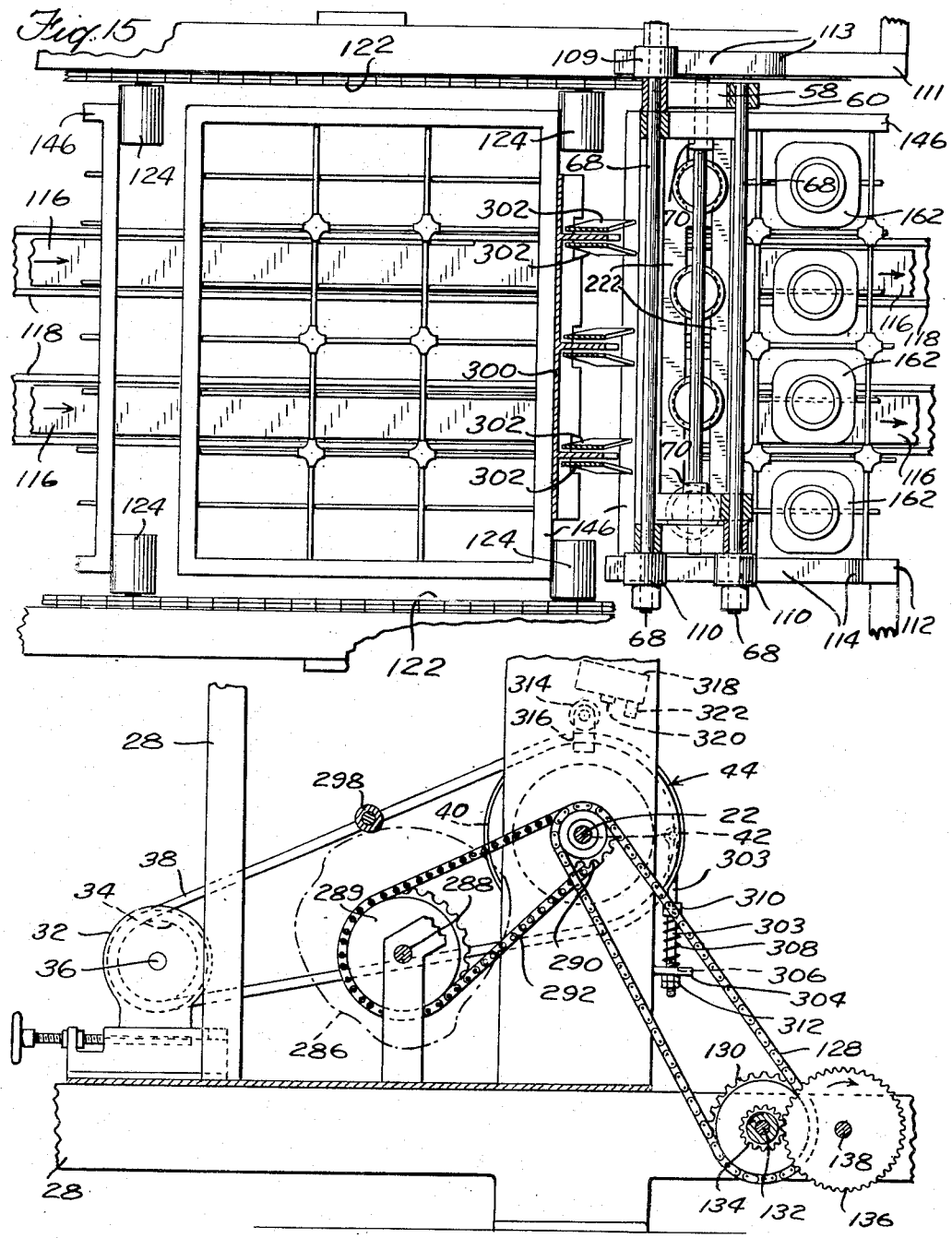

Patented July 27, 1954

2,684,800

UNITED STATES PATENT OFFICE 2,684,800

MACHINE FOR INSERTING CONTAINERS OR BOTTLES IN CASES, CRATES, OR CARTONS

Stephen J. Lewis, Brooklyn, N. Y.

Application December 16, 1950, Serial No. 201,193

17 Claims. (Cl. 226—14)

This invention relates to machines for picking up packages, such, for example, as milk containers, milk bottles or other packages of uniform dimensions, and putting them into crates, boxes, cases or cartons, and it has for its general object the provision of a machine for such purposes which will perform its functions with speed and precision and without danger of injury to the packages or to the machine. More particularly the invention is directed to a machine for putting into crates, boxes, cases or cartons packages of such a character that they are preferably handled in an upright position, the invention being herein shown as embodied in a machine particularly adapted for picking up milk containers or milk bottles and placing them in upright position in the cases or crates in which they are usually carried to the retail stores or other retail outlets.

With the foregoing and other objects in view, the invention is shown as embodied in a machine in which the containers or bottles to be placed in the crates or cases are brought to the case or crate packing machine on an endless conveyor in single file, assembled and then picked up in groups that will fit the transverse dimensions of the case, crate or carton by suitable lifting devices and placed in successive positions in the case, crate or carton which is arranged to travel beneath the container or bottle handling means at such a synchronized speed that each succeeding group will arrange itself in the case or crate adjacent to or in other predetermined relation to the preceding group until the case or crate is full.

An important feature of the invention is found in the novel means for and novel method of picking up the containers and carrying them to the point of deposit in the case, the novel method including an arrangement of the endless carrier for the pick-up means and the mounting of the means on this carrier so that there is no horizontal movement of the pick-up means while the pick-up operation is taking place.

Another important feature of the invention is the movement of the pick-up means through a path that is relatively steeply inclined at the point of delivery of the containers to the case or crate and the synchronization of the movement of the carrier through this steeply inclined path with the horizontal movement of the case or crate into which the containers are to be inserted so that the delivery of the containers to the crate by the pick-up means will place them in immediate juxtaposition to the group of containers already deposited in the crate, or to the crate end if the containers thus delivered happen to be the first group placed in the crate.

Still another important feature of the invention, where the pick-up means as herein shown comprise tongs of the lever-grip type, is the novel means for effecting the opening of the tongs to embrace the containers, bottles or other packages as the case may be at the pick-up point and the novel means for again opening the tongs for discharging the containers, bottles or other packages after they have been introduced into the case or crate. As above suggested, the synchronization of the movement of the pick-up means or tongs with the movement of the case or crate past the point of insertion of the containers or other packages into the crate is important and another important feature of the invention is the novel means for bringing about such synchronization.

Still other novel features of the invention are the lead-in devices for insuring proper positioning of the containers or other packages in the crates in respect both to the crate and to each other during the insertion thereof and various safety devices for insuring stoppage of the machine when there is interference in any manner with its proper operation.

Other important features, objects and advantages of the invention which have not specifically been mentioned hereinabove will appear hereinafter when the following specification and claims are considered in connection with the accompanying drawings, in which—

Figure 2 is a sectional view of the machine taken on the line 2—2 of Figure 1;

Figure 3 is an enlarged detail sectional view taken on line 3—3 of Figure 4, of the means for opening the pick-up means or tongs at the pick-up point in the travel of these pick-up devices, this view also showing the arrangement of the carrier chain so that there is no horizontal travel of the pick-up means during the pick-up operation;

Figure 4 is a fragmentary side elevation of the mechanism shown in Figure 3;

Figure 5 is an enlarged section taken on line 5—5 of Figure 6 of the means for opening the pick-up means or tongs for discharging the container or other package after it has been inserted in the crate, this view also showing the means for maintaining the pick-up means in open condition until it has started upon its return travel upwardly;

Figure 6 is a section taken on line 6—6 of Figure 5;

Figure 7 is a detail rear elevation of one of the pick-up devices referred to in the specification as a grab hook or tongs;

Figure 8 is a front elevation, with certain parts in section, of the mechanism shown in Figure 10 showing the initial position of the lead-in flag;

Figure 9 is a detail view of means for bringing the lead-in flag into position to guide the container into the crate that is being filled;

Figure 10 is a side elevation, taken on line 10—10 of Figure 8, showing one form of means for bringing a lead-in flag into and out of operative container locating and guiding position in the crate that is being filled;

Figure 13 is a section on line 13—13 of Figure 12 of the machine modified to pick up bottles, such as milk bottles, and insert them in crates having spacing racks therein;

Figure 14 is an enlarged section, taken on line 14—14 of Figure 13, of the bottle distributing and spacing means associated with the machine when used for crating bottles and designed to place the bottles in properly spaced relation to each other in groups of crate width preparatory to being picked up by the pick-up means;

Figure 15 is an enlarged horizontal section, taken on line 15—15 of Figure 13, showing crate lead-in flag and tong rollers operating mechanism, and Figure 16 is a sectional view taken on line 16—16 of Figure 12 of safety stop means associated with the speed reducer to stop the machine in case of interference with its smooth operation.

Figure 1:
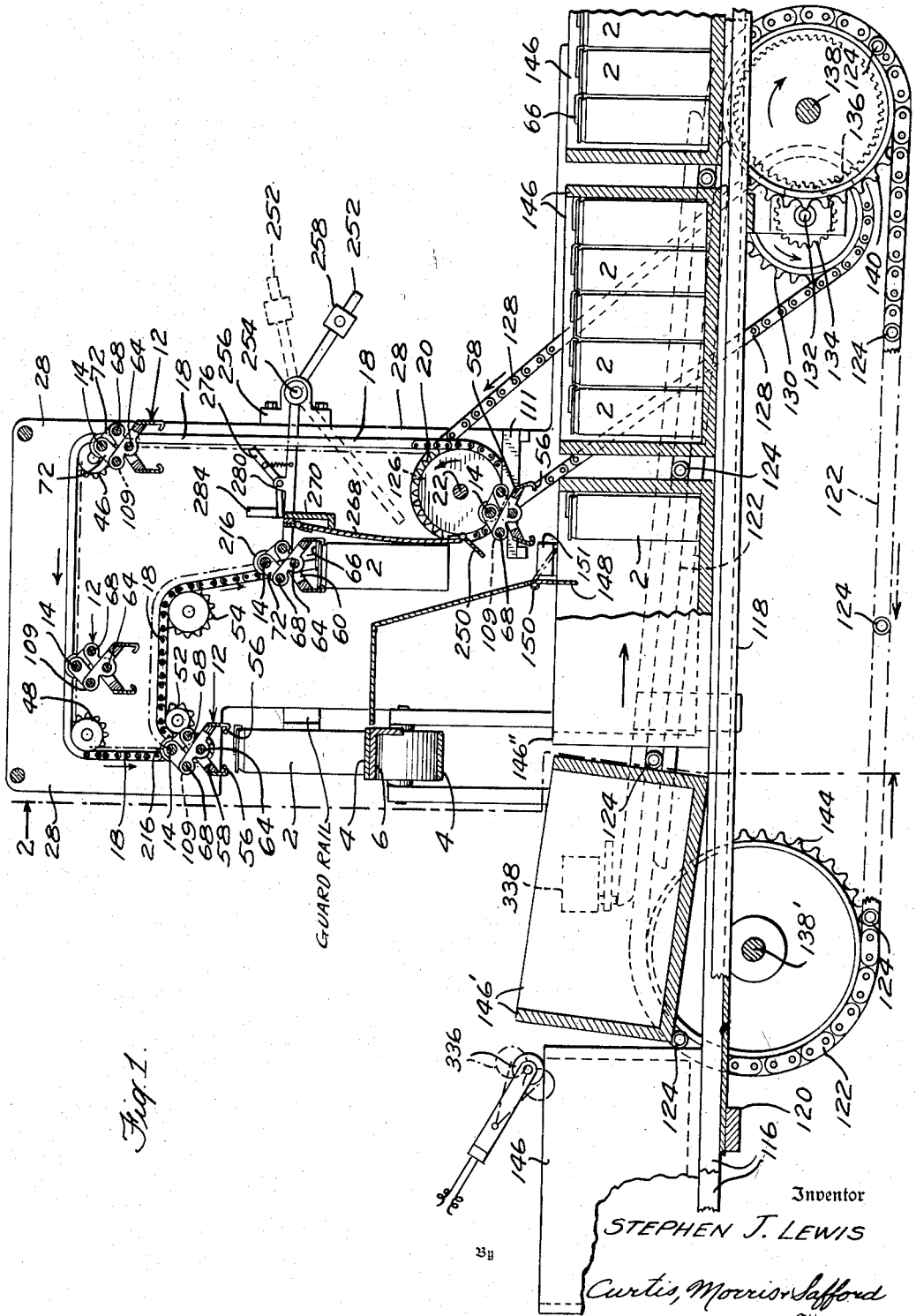
Figure 1 is a central vertical longitudinal section taken on line 1—1 of Figure 2, of a machine embodying the invention, the invention being here shown in a machine for inserting paper milk containers into their carrying crates.

Describing first the embodiment of the invention which is designed particularly for use in picking up and placing in crates, cases, boxes or cartons paper containers such as are now used extensively for marketing milk, such containers being substantially square in cross section and being usually packed with their side faces in contact with each other, the containers are brought to the machine at one level by means of an endless belt conveyor passing over a flat supporting surface, at the pick-up station, and the crates, boxes, cases or cartons into which the containers are to be placed are carried through the machine on another endless conveyor at a lower level. Synchronization of the movements of the conveyor that brings the containers to the machine with the movements of the conveyor that carries the crates or cases through the machine is not necessary but it is important that the movement of the pick-up mechanism which picks the containers up from the conveyor and places them in the crates or cases be positively synchronized with the movement of the crates or cases through the machine. This is done by novel mechanism hereinafter more fully to be described.

As shown in Figure 2, the containers 2 are carried from the container filling machine to the point in the machine of the present invention at which they are to be picked up in groups of four by the grab hooks, grippers or tongs, hereinafter more fully to be described, upon an endless conveyor belt 4 travelling over a table 6. The pulley at the casing machine end of the conveyor over which the endless belt 4 travels is shown at 8.

As shown, the containers 2 are preferably placed on the belt 4 at the filling machine in spaced relation to each other so that in the event of temporary stoppage of the mechanism which picks them up and puts them into crates or cases the continuously moving endless belt 4 will not bring too many into contact with each other near the machine. This belt is preferably of a material over which the containers may easily slide so that as the foremost container in the line on the belt 4 comes up against the stop 10 at one side of the pick-up point the container will stop until the next container is brought up against it, this operation continuing until at least four containers have thus been brought together side by side in position to be picked up by one of the grab hooks, grippers or tongs.

The grab hooks, grippers or tongs, which may be in the form of tongs of the lever-grip type and which have jaws 12 having pick-up edges and which have jaws 12 shaped to enter the grooves under the overhanging lips near the tops of the ordinary paper milk containers, utilize the principle of operation of tongs of the lever-grip type and the jaws, as hereinabove suggested, are of such dimensions that each grab hook, gripper or tongs can pick up a group of four containers.

The grab hooks or tongs are suspended from rods 14 extending between offsets 16 inwardly projecting from two sprocket chains 18 which pass over driving sprocket wheels 20 on a shaft 22 mounted in bearings 24 and 26 in side frame members 28 and 30. The shaft 22 is driven from a motor 32 through a V-belt pulley 34 on the motor shaft 36, the V-belt 38 passing over a larger pulley 40 on a short shaft 42 connected through a differential speed reducer 44 to the shaft 22.

As herein shown—see particularly the front view Fig. 1 and also Fig. 5—the driving sprocket wheels 20 are located at the lowest point of travel of the sprocket chains 18 and therefore at the lowest point of travel of the grab hooks, which point, as more fully set forth hereinafter, is also the point of discharge of the grab hooks. As the sprocket chains 18 leave the driving sprockets 20 they pass upward substantially vertically over idler sprockets 46 and then along a horizontal path of travel to a second set of idler sprockets 48 and downward over idler sprockets or wheels 50 of relatively small diameter, located at the point where the grab hooks pick up the packages to be transferred to the cases or crates, the direction of travel of the chains 18 being reversed as shown for a short distance after the grab hook picks up the container whereby there is no, or substantially no, horizontal travel of the grab hook during the picking up operation, as hereinafter more fully set forth. At the end of this reverse or short upward travel of the chains 18 they pass over idler sprockets 52 and then, after a short horizontal travel, over other idler sprockets 54, after which the chains 18 travel in a steeply inclined path back to the driving sprockets 20 and thus to the point of discharge of the grab hooks.

As above stated, the offsets 16 project inwardly from the sprocket chains 18, that is, toward each other in directions parallel to the axis of rotation of the shaft 22. In order that the grab hooks or tongs may pick up the packages to be placed in the cases or crates without any, or substantially any, horizontal travel during the picking up operation, these offset links 16 are also offset inwardly in respect to the closed path of travel of the chains 18. This offset is preferably sufficient so that, as shown in Figure 3 above referred to, when the chains are traveling over the small-diameter idler sprockets 50 the rods 14 on which the grab hooks or tongs are hung will travel downwardly and back upwardly in a vertical plane which includes the axis of rotation of the idler sprockets 50 (see Figs. 1 and 3) thus avoiding any horizontal movement of the grab hooks or tongs at this point in their path of travel, this being the point at which the picking up operation of the hooks or tongs takes place.

As shown more particularly in Figure 7, each grab hook or tong member comprises package-engaging jaw portions 12 which may be made up of sheet steel bent, as shown, to provide a hook-like portion 56 that enters the groove beneath the upper edge of the ordinary milk container, these jaw portions 12 being attached in any suitable manner to a lever forging or casting 58 having two upwardly extending arms 60 provided with hubs 62 received upon a pivot rod 64. As above pointed out, the hook portions 56 of the jaws 12 are of such dimensions and so located lengthwise of the jaw levers 58 that, in the illustrative embodiment of the invention, they will engage and pick up four milk containers at one operation. It will also be noted that the hook portions 56 of the grab hook tongs are of such shape along the container edges that they will straddle the caps 66 which cover the pouring spouts of the containers and thus avoid accidental opening of the pouring spouts.

Each of the arms 60 is provided in that part which extends above the pivot rod 64 with an opening to receive a second pivot rod 68, there being two of the pivot rods 68, one for each grab hook or tong lever 58. The pivot rod 64 may be held in its proper relation to the grab hook or tong levers and the grab hook or tong levers may be held in proper relation to each other by suitable means such as collars 70 clamped upon the pivot rod 64. It will be noted that the two grab hook or tong levers are duplicates and that the jaw portion of each lever is at one end flush with the side of the arm 60 and at the other end extends beyond the arm 60 so as to cooperate with that part of the jaw of the other lever which is flush with its arm.

The pivot rods 68 are supported by links 72 carried by the rods 14, each of these links being provided with an offset hub 74 having a tangential ear 76 tapped to receive an adjustable stop screw 78 held in adjusted position by a lock nut 80. It will be seen that when these links 72 are suspended in opposed relation upon the rod 14, which in turn is carried by the sprocket chains 18, with the hubs 82 of the links abutting, the offset hubs 74 of the links will be brought into such relation to each other that the stop screws 78 are in axial alignment and, when suitably adjusted, will determine the closed position of the jaws of the grab hook or tongs, thereby preventing the hook edges 56 from piercing or otherwise injuring the container.

From the foregoing description it will be seen that the grab hooks or tongs suspended from the rods 14, connected to the sprocket chains 18, tend to move to their closed or package engaging position under the action of gravity and that means must be provided to move them to open position in order to bring the hooks 56 into pick-up relation to the containers 2 which are to be picked up from the conveyor belt 4 and carried to the case or crate into which they are to be placed or packed. The means for effecting such opening of the grab hooks or tongs as they move down into pick-up relation to the containers 2 is shown particularly in Fig. 3 and comprises wedge blocks 86 mounted on pivots 88 in a slot in a block 90, each of these wedge blocks having the shapes and proportions shown so that they tend to gravitate into the position shown in Fig. 3 in which their inclined upper ends 92 engage rounded extensions 94 on the jaw levers 58 of the grab hooks or tongs as the grab hooks or tongs approach their pick-up position, that is, when the grab hook or tongs suspension rod 14 approaches the limit of its vertical travel downward preparatory to its travel upward in the same vertical path as the conveyor chains pass around the idler sprockets 50. It will be seen that, as the studs or extensions 94 engage the inclined upper ends 92 of the wedges 86 at this point in the travel of the grab hook or tongs, the wedges 86 being constrained by their adjustable stops 96, the action of the inclined faces 92 is that of a spreading wedge, forcing the jaws 12 apart and separating the container engaging hooks 56 so that they can pass over the upper end of the containers 2 standing on the conveyor 4 at the pick-up position.

As the grab hooks or tongs complete their downward travel at this point the end studs or projections 94 on the jaws 12 pass completely over the ends 92 of the wedge blocks 86, the downward movement of the extensions being limited by the table top 98 of the block 90. Thus as the grab hooks or tongs start their return travel up the short vertical path at the pick-up point, the projections 94 engage the outer sides of the wedge blocks 86 which rock freely about their pivots 88 and thus move toward each other as the grab hooks or tongs start upwardly, thus permitting the hook portions 56 to engage beneath the top lips of the containers 2 and pick up the group of containers standing at the pick-up point, the hooks 56 being kept at proper container engaging level as the extensions 94 slide on the table top 98 during the jaw-closing operation. As soon as the projections 94 pass up over the outer faces of the wedge blocks 86 these blocks will again rock back to the position shown in Fig. 3 and be ready to spread the jaws of the next grab hook or tongs that comes into pick-up position.

As shown in Figs. 1 and 3, the upward travel of the grab hooks or tongs with the chains 18 is preferably only sufficient to insure gripping and picking up of the containers by the grab hooks or tongs and movement of the projections 94 clear of the wedge blocks 86 after which the chains change direction as shown and the grab hooks or tongs carry the containers through a short horizontal path of travel before starting their steeply inclined downward travel to the point at which the containers are deposited in the case, crate, box or carton and the grab hooks or tongs are again opened to release the containers.

The means and method of opening the jaws of the grab hooks or tongs to release the containers as they are placed in the case or crate differ somewhat from the means and method of opening the jaws to permit them to pick up the containers. As shown particularly in Fig. 5, there is located at the point where the containers are to be released from the grab hooks or tongs and deposited in the case or crate, jaw opening mechanism comprising bars 100 and 102, the upper edges of which are adapted to engage the extension lugs 94 on the jaw levers 56 of each grab hook or tongs, the bar 102 being pivoted at 104 to tilt to the right away from the bar 100, a counterweight 106 on an arm 108 connected to the bar 102 tending to hold the bar 102 in its idle position against the bar 100 as shown in Fig. 5.

It will be seen that these bars are so located in the path of travel of the lugs 94 on the grab hooks or tongs as the chains 18 travel around the driving sprockets 20 that these extension members 94 engage the upper edges of the bars 100 and 102. The weight of the load carried by the grab hook or tongs and its own weight pressing on the upper edges of the bars 100 and 102, and particularly the pressure of the right hand extension 94 in Fig. 5 on the pivoted bar 102 will cause this bar 102 to rock about its pivot 104 and thus wedge open the jaws of the grab hook or tongs thereby releasing the containers carried by it so that they will drop the remaining short distance to the bottom of the case or crate into which they have been introduced. As is seen from Fig. 9 the containers enter the case or crate with clearance from the preceding set of containers or from the forward end of the case but as the containers approach their discharge point the chains 18, following the curvature of the sprockets 20, tend to pack the containers close to the preceding set of containers or forward end of the case. Further as shown on Fig. 5 the interaction of the projection 94 on the top of the blocks 100 and 102 prevents any swinging of the container to the left due to the aforesaid acceleration of the container to the right at the point of discharge. This takes place before the suspension rod 14 for the particular grab hook or tongs has reached its lowest point of travel. This point of travel of the suspension rod 14, as will be seen from Fig. 5, will be reached just as the extension members 94 are about to ride off the upper edge of the bars 100 and 102 so that if other means were not provided to keep the jaws open and also lift them away from these edges there might be interference with the free movement of the jaws onward from the point of discharge of the containers.

As shown in Figs. 10 and 15 the pivot rods 68 each carries at its end near the front of the machine a roller 110 while at its rear end the left hand rod only in Fig. 15 carries a roller 109. These rollers, after each grab hook or tongs is opened to discharge the containers, engage rails 112 and 111 respectively so that further downward movement of the suspension rod 14 will cause the jaws of the grab hook or tongs to open wider and at the same time move upward away from the upper edges of the bars 100 and 102. To prevent the upward movement of the suspension rod 14 from again causing the jaws of the grab hook or tongs to tend to close, and thus tend to reach lower down as the suspension rod 14 moves upward from its lowermost point of travel, the tracks 111 and 112 are curved upwardly as shown at 113 and 114, these curves being so spaced along the path of travel of the conveyor that the roller 110 at the near side of the first or right hand rod 68 and the roller 109 of the second rod 68 on the far side, climb the incline 114 and 113 respectively at the same time, thus compensating for the momentary lowering of the bottom of the jaws when the grab hooks or tongs close due to the rising of the suspension rod 14, as the chain 18 travels upward from the right side of the sprocket 22 shown on Fig. 1.

As herein above pointed out, it is important that the case or crate that is to be filled with the containers or other packages be moved past the filling station in absolute synchronism with the movements of the grab hooks or tongs into container or package delivering position. To insure such synchronous movement the mechanism now to be described is provided.

The cases or crates to be filled with the containers or other packages are brought from their source of supply to the synchronizing means on an endless conveyor which may be in the form of parallel chains 116 having smooth surfaces on which the cases or crates are carried so that the chains may slide beneath the case or crate whenever its movement is retarded. A belt or gravity roller conveyor might also be used. As shown in Figs. 1 and 2 the conveyor consists of chains 116 travelling in channels 118 on a support 120. The endless chains 116 preferably are driven by means independent of the machine drive at a speed somewhat greater than the speed of movement required to place the case or crate in its successive receiving relations to the grab hooks or tongs. This speed may, for example, be one and one-half times the speed of movement of the case or crate past the filling station.

To insure synchronous movement of the case or crate past the filling station means are provided for metering the movement of the case or crate with the endless belts 116, this means permitting a movement past the filling station only fast enough to synchronize the movement of the case or crate with that of the movements of the successive grab hooks or tongs into container or package depositing relations to the case or crate. The case or crate meting mechanism comprises sprocket chains 122 upon opposite sides of the path of travel of the cases or crates, these chains, at properly spaced intervals, have studs carrying rollers 124, as shown on Fig. 2, which are short enough to clear the channel 118 of the chains 116, but are long enough to project into the path of the cases or crates 146, or, if the case carrying conveyor be made of gravity rollers the studs on the chains 122 could be tie rods across the chains 122 carrying a long roller taking the place of the roller 124 and crossing the paths of the cases to meter their movements. The rods can also be used instead of studs if the chains 116 are discontinued at each end of the casing machine of my invention and to carry the cases within the casing machines a short set of chains, equivalent to and driven at the same speed as the chains 116 are constructed with sprockets on the shafts 138 and 138' and driven by the shaft 138' which is the idle shaft of sprocket 144 of the chain 122. These studs or tie rods and roller 124 projecting into the path of the cases, crates or cartons 146, form a sort of a ladder the prongs of which contain the cases, crates or cartons and constrain their motion in synchronism to the delivery of the containers or bottles by the grab hooks or tongs, since the studs and roller carrying chain 122, as will now be described, is driven by sprocket wheels which are interconnected with the sprocket wheels that drive the chains 18 which carry the grab hooks or tongs.

Figure 12:
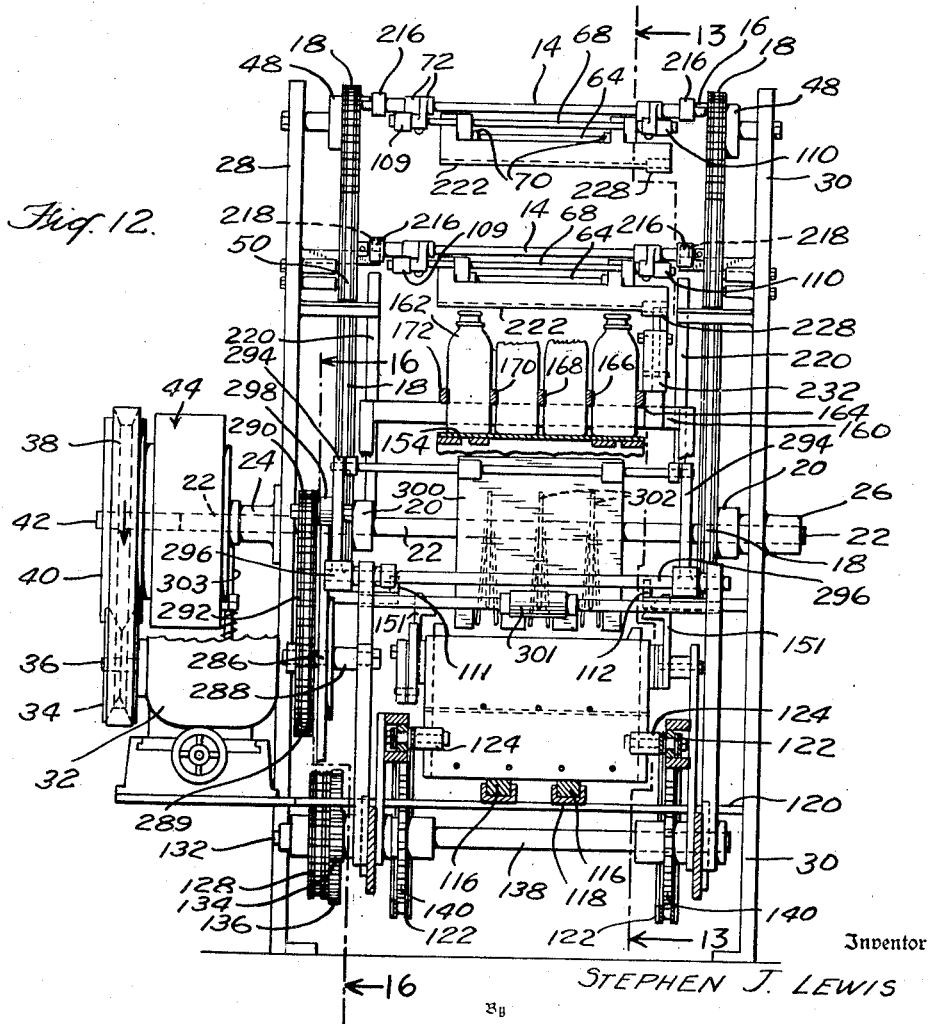
Figure 12 is a section of the machine taken on line 12—12 of Figure 13.

As shown in Figs. 1, 12 and 13, a sprocket 126 on the shaft 22 is connected by sprocket chain 128 to a sprocket 130 on a stud shaft 132, the sprocket 130 having attached thereto a pinion 134 meshing with a gear 136 on a shaft 138 which also has attached thereto sprocket wheels 140 for driving the chains 122 which carry the case or crate controlling pins 124.

In meting or timing cases, crates or cartons travelling close together on a conveyor the problem is to separate them, and I provide the following means to do it. From an inspection of Figs. 1 and 2, it will be seen that the chain 116 travels at a faster rate than the chain 122. It is apparent therefore that the case 146 at the left of Fig. 1 is forced against the rollers 124, and that as the rollers 124 travel along the case 146 follows to its position 146'. There its rear end is lifted by the succeeding roller 124 and the succeeding case, which now occupies the position 146, is forced against the rollers 124, thus completing a cycle of case separation. Further as this first case in question proceeds to the position 146'', the chain 122 assumes a straight line position and consequently the linear distance between rollers 124 is greater than when the chain 122 had a curved position over the idler sprocket 144. Due to the traction of the faster moving chains 116 and the relatively frictionless rollers 124 the case assumes the position 146''', butting against the leading rollers 124, the clearance from the succeeding rollers 124 allowing for ordinary tolerances of length variation of the cases. As the chains 122 proceed to the driving sprockets 140 they slope below the chains 116 and the filled cases are free from the restraint of the timing or metering rollers 124, and are carried away by the chains 116. Since the drive sprockets 140 of the chains 122 are synchronized with the drive sprockets 20 of the chains 18 the cases 146, while they are going through the casing machine, are synchronized with the grab hook or tongs. Thus while the cases are going through the casing machine they are filled with successive rows of containers brought by the synchronized grab hooks or tongs.

When the machine, as so far described, is being operated to handle pasteboard milk containers of rectangular section the timing of the movements of the cases or crates 146 and the movements of the grab hooks or tongs is such that successive rows of containers are placed in the case or crate with each row in immediate contact with the preceding row. With proper synchronization of the movements of the crates and the grab hooks or tongs the successive rows of containers are placed in the crate in proximity to each other. However, to avoid any possibility of the bottoms of the incoming containers striking the forward end of the case or carton or crate or to avoid striking the previously deposited rows of containers, a forward lead in flag 250 is provided as shown on Figs. 1, 2, 8, 9 and 10, this flag being moved into and out of position as the successive grab hooks or tongs are moved into and out of bottle or container depositing relation to the case or crate. This movement is brought about by the lever arms 252 attached in a common plane to a shaft 254 having bearings in pillow blocks 256 on the machine frame, so that the inner ends of the lever 252 are successively engaged by the rollers 216 on the suspension rods 14 carried by the sprocket chain 18. The other arms of the levers 252 carry counterweights 258 which tend to hold the lever arms 252 in their uppermost position.

Pivoted at 260 on the arms 252 is a bracket comprising short arms 262 extending away from the pivots 260 and a crossbar 264 to which is connected, by hinges 266, a depending baffle plate 268. A stop member 270, attached to the crossbar 264 of the aforementioned bracket, limits the movement of the baffle plate 268 in one direction. At its lower end the baffle plate 268 has hinged thereto at 272 the lead-in flag 250 for directing the bottles or containers into their proper position in the case or crate. A torsion spring 274, as shown on Fig. 10, is carried by the hinge pin 272 which urges the lead-in flag 250 into the position shown on Fig. 8 and permits it to retract under the pressure of the container to the position shown on Fig. 9.

On the upper side of each arm 252 a latch 276 is pivoted at 278 between ears 280, this latch having its two arms arranged at an obtuse angle to each other and being pulled by a spring 282 into such position, when the arms 252 have been rocked away from the stop 284 on the machine frame which limits the upper movement of the arms 252, that each latch 276 will be moved into the path of and engage the rollers of the associated chain 18.

From the foregoing description it will be seen that when a roller 216 associated with one of the grab hooks or tongs engages the outer end of an arm 252 and moves the lead-in flag 250 down into position to guide into the case or crate the containers or bottles being introduced thereinto by the next grab hook or tongs in advance of the one whose roller 216 is operating to depress the arm 252, the latch 276 will be moved out of engagement with the stop 284 and the spring 282 will cause it to ratchet against the rollers of the chain 18. But, when the arm 252 is disengaged by the rollers 216 and the arm 252 tends to swing to its idle position, the latches 276 engage the rollers of the chain 18 and thus control the upward motion of the arm 252 until it again abuts the limit stop 284 which disengages the latch from the roller of the chain 18, thus completing a cycle of operation of the lead-in flag in leading in one set of containers past the previously deposited set of containers or the forward end of the case or crate. The lead-in flag is now ready for the next cycle. To insure, however, that the last row of containers will not strike the rear end of the crate 146 a lead-in flag 148 is hinged to the plate 150 so that as the crate continues its movement the flag will ride up out of this crate and over the front end of the next crate and down into that crate to serve in a similar capacity there. Further, to prevent the containers or bottles from striking the sides of the cases or crates the side lead-in guides 151 are provided as shown on Fig. 2. As herein shown the cases or crates are designed to take five rows of containers, each row comprising four containers. Also the chain 18 carries five grab hooks or tongs 12 and makes one cycle of travel per case. However, neither the number of containers per row nor the number of rows per case, nor the number of grab hooks, nor the cycles of chain per case described above constitute a limitation of my invention. For instance, Figs. 13 and 15 show a machine of my invention which has three rows of four bottles per case, and the chain carries six grab hooks and makes one half a cycle of its travel per case.

When the machine is designed to place glass containers, such as milk bottles, in crates, it is customary to provide spacers between the bottles to prevent injury and also noise from their striking against each other in transportation. The crates or cases used with such bottles are, therefore, usually provided with racks, the slats or bars of which engage the sides of the bottles about midway of their height. In order that the grab hooks may pick up a row of four such bottles, for example, in such manner that the bottles may be deposited in the spaced compartments of the racks it is necessary so to bring the bottles into the pick-up position that they are properly spaced from each other before the row of bottles is picked up. In Fig. 14 I have shown more or less conventional means for effecting such spacing. In this figure the endless conveyor 152, which brings the filled bottles from the bottle filling station, is preferably of a type which slides readily beneath the bottles when the movement of the bottle or bottles is retarded. This conveyor 152 is shown as running at right angles to the table conveyor 154 which carries the bottles to their pick-up position. However the conveyor 152 could just as well be leading to the same position of the conveyor 154 in a straight line. The conveyor 154, like the conveyor 152, is preferably of the type that will slide beneath the bottles when the movement of the bottles is retarded and is wide enough to carry four suitably spaced bottles into pick-up position.

The conveyor 152 and the conveyor 154 are driven at the same speed either by the casing machine of my invention or by the filling or capping machine supplying the bottles. The speed of the casing machine of my invention can be regulated by a conventional variable speed device, and can be set to accommodate the bottles or containers brought by the conveyors 152 and 154. Further means have been provided as will be explained hereinafter which will automatically prevent mishap due to gradual creeping of the above controls.

The assembling of four bottles properly spaced from each other in a row ready to be picked up by a grab hook at the pick-up station is brought about by the mechanism now to be described, operating in the manner set forth, and illustrated in Figs. 13 and 14. The endless table top conveyor 154 travels over sprockets 156, 158, the sprocket 156 carrying the conveyor slightly beyond a stop bar 160 against which the row of four containers 162 to be picked up is assembled. Extending rearwardly from the stop bar 160 and secured on it are bars 164, 166, 168, 170 and 172, the outside bars 164 and 172 determining the length of the row of bottles to fit it to the width of the case or crate into which they are to be inserted and the bars 166, 168 and 170 being spacer bars which so space the bottles that they will enter the rack compartments in the case or crate.

The bottles 162 (see Fig. 14), brought in a filled condition to the machine on the endless conveyor 152, are confined between lateral guides 174 and 176 which are curved as shown to direct the bottles from the conveyor 152 to the conveyor 154. The first distributor of the series of distributors comprises interconnected arms 178, 190 and 192 on a pivot 180. A toggle spring 182, anchored on the pin 184, prevents the distributor from swinging out of place due to vibration. As the leading bottle 162 reaches the discharge end of the guides 174 and 176 it comes into position to engage the arm 178 and, due to the angular position of the arm 178 and to the movement of the conveyor 154, the bottle makes ⅛ counterclockwise turn until its adjacent side contacts the arm 190. Moreover because of the propulsion of the bottles by the conveyor 154 the same bottle and the whole distributor make one ¼ counterclockwise turn until the arm 190 is stopped by the stop 194. The propulsion of the conveyor 154 then causes the bottle 162 to slide out of the arm 190 turning counterclockwise another ⅛ turn until further turning is prevented by the guide 186. The above completes a half cycle of operation of the first distributor and it is now set with its arms 178 and 192 in position to guide the following bottle in the opposite direction in like manner. The interconnected arms 206, 210 and 212 constitute the second distributor with pivot and spring like those of the first distributor. Likewise the interconnected arms 200, 204 and 208 constitute the third distributor.

Following the movements of the bottle 162 as it proceeds through the second distributor it first engages the arm 210, makes ⅛ clockwise turn, sliding on the conveyor until it comes into the pocket of the arm 212. Then by reason of propulsion of the bottle by the conveyor 154, the bottle 162 and the second distributor make ⅛ turn clockwise. The bottle, due to the restraining effect of the guides 168 and 166, stops turning and then proceeds between these two guides. The second distributor, due to the bearing of the bottle against the arm 212 and the action of the toggle spring makes a further ⅛ clockwise turn and thus completes its half cycle of operation and is ready to receive the third bottle coming along and to guide it in like manner in the opposite direction between guides 164 and 166. In like manner the third distributor guides the second bottle between the guides 168 and 170 and the fourth bottle in the opposite direction between the guides 170 and 172, thus concluding a complete cycle of operation of the distributing unit as a whole for one row of bottles. With repetition of this cycle of operations successive rows of bottles are brought into position to be picked up, the bottles in a row being spaced by the guides 164, 166, 168, 170 and 172 to suit the crosswise separation of the compartments of the cases or crates 146. The motion of the rows of bottles is arrested by the limit bar 160 so that the leading row of bottles is in a position to be picked up by the oncoming grab hooks or tongs 12, and carried to the cases or crates 146 substantially in the same way as that employed when picking up containers and placing them in cases, cartons or crates. In both forms of the apparatus, when the group of bottles or the group of containers is being carried by the grab hook, gripper or tongs through the horizontal path of travel of the sprocket chains 18 between the idler sprockets 52 and 54 it is desirable to have positive support for the ends of the suspension rod 14. To this end the suspension rod 14 is provided near its outer ends with rollers 216 and the machine is provided on each side along the horizontal path of travel of the sprocket chains 18 with tracks 218 on which the rollers 216 travel, thus providing positive support for the grab hook or tongs and the containers or bottles carried thereby. It is also desirable that similar tracks 220 be provided along the steeply inclined path of travel of the grab hooks or tongs.

Figure 11:
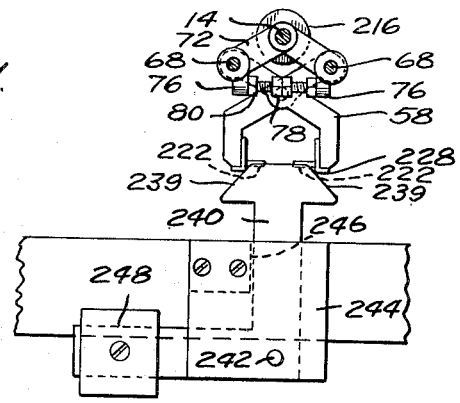
Figure 11 shows a modified form of the means for opening the bottle or container pick-up devices or tongs at the discharge position.

The grab hooks, grippers or tongs used in picking up a group of bottles and placing them in the case or crate may be of substantially the same construction as those used with the paper containers, except that the hooks or teeth 222 which engage the bottle neck are shaped to fit the rounded bottle neck. The mechanism for opening the grab hook, gripper or tongs at the pick-up point may be substantially that employed with the containers, or it may be a slight modification thereof as shown in Figs. 11, 13 and 14. In the modified construction the wedge blocks 224 are shown as having rounded ends 226 engaged by the projections 228 on the jaw levers 58 and the wedge blocks are so mounted in a slot 230 in a block 232 having a table top 234 that they both pivot on a common pivot 236 and are crossed so that their bevelled lower ends 238 are stopped against the sides of the slot 230. The operation of the wedge blocks 224 is otherwise substantially the same as that of the wedge blocks 86 hereinabove described. In other words, the extensions 228 on the jaw levers 58 engage the rounded ends 226 of the wedge blocks 224 and ride down over these rounded ends until they rest upon the table top 234, which completes the jaw opening movement. When the grab hook or tongs starts to move upward again the engagement of the extensions 228 with the lower edges of the rounded ends 226 causes the wedge blocks to rock about their common pivot 236 in such manner that the jaws may move toward each other and grip the bottle or container.

The jaw opening mechanism at the discharge station hereinabove described for use with containers may also be used with bottles or the modified form shown in Figure 11 may be used. In the modified construction shown in Fig. 11 a wedge member 239, formed on the upper end of a bellcrank lever 240 fulcrumed at 242 in a block 244 and held against a stop 246 by counterweight 248 on its other arm, engages the extensions 228 on the jaw levers 58 as the grab hook or tongs approaches discharge position, thus opening the jaws to release the bottle or container after it has been introduced into the case or crate. It will be seen that the bellcrank can be rocked about its pivot in the direction of travel of the grab hook or tongs, so as to accommodate the position that the bottles assume in the compartments of the crate or case, prior to and at the time they are being released, also to accommodate the horizontal motion of the grab hooks, until the action of the rollers 109 and 110 on the tracks 111 and 112 respectively lifts the jaws of the grab hooks above the wedge 239.

Hereinabove I have described a forward lead-in flag, side lead-in guides and a hinged rear lead-in flag. However, where cases or crates with compartments are used and the partitions inside the cases are a considerable distance below the tops of the cases, such as are used for casing milk bottles, it is desirable, in order to prevent any possibility of the bottles or containers from striking the rear and the sides of the compartments as well as the rear ends of the cases, to provide a rear lead-in flag operated by a cam in order to take care of the difference in level between the partitions and the ends of the cases or crates. This feature of my invention is illustrated in Figs. 12 and 13. The movement of the rear lead-in flag is effected in timed relation to the movement of the crates or cases past the point of introduction of the bottles or containers thereinto, this movement being brought about by a cam synchronized with the means for timing the movements of the cases or crates into bottle or container-receiving position. As shown in Fig. 12 the cam 286, mounted on a stud shaft 288, has connected thereto a sprocket 289 driven from a smaller sprocket 290 on the shaft 22 by a chain 292. Two levers 294, one over the far side of the case or crate conveyor and the other over the near side of the case or crate conveyor are both rigidly fixed on a common fulcrum shaft 296. The lever on the near side, a lever of the third class, has a cam roller 298 resting on the upper edge of a cam 286. At their outer ends the levers 294 have hinged thereto the lead-in flag 300 the lower end of which is slotted to straddle the lengthwise separation of the compartments of the cases or crates. The lead-in flag 300 is preferably provided with separators 302, the lower ends of which are provided with flat springs, and each set of springs is bent to converge so as to clear the lengthwise partition of the cases or crates and is flexible enough to spread when wedged apart by the entering bottles or containers, thus guiding the bottles or containers into the appropriate laterally spaced compartments defined by the racks in the crates. It will be seen that the rear lead-in flag 300 will move up and down with the roller 298 as the roller rides over the hills and valleys of the cam 286 and that, since the cam 286 is driven in synchronism with the movement of the cases or crates into bottle or container-receiving position and also in synchronism to the movement of the grab hooks or tongs into position to introduce the bottles or containers into the cases or crates, the lead-in flag 300 will be brought into position to help guide the bottles or containers into their proper positions in the cases or crates and will then be withdrawn, the withdrawing movement being sufficient to lift the lower edge of the lead-in flag 300 above the upper edge of the case or crate. As mentioned above the lead-in flag 300 is hinged and leans against a roller 301 obtaining an outward inclination slightly projecting into the path of the oncoming bottles or containers, sufficiently so that the bottles slide on it and do not tend to swing forward, thus the bottles can slide into their compartments in the cases without a forward lead-in flag.

To prevent operation of the machine when the supply of containers fails or the supply of crates fails, and also to prevent operation when there is jamming for any reason as, for example, jamming of the crate conveyor, means are preferably provided for automatically stopping the machine. For example, in Figs. 12 and 16 are shown means for automatically stopping the machine in the event that the crate conveyor jams.

As hereinabove pointed out, a speed reducer 44 of the differential type is provided between the pulley 40 driven from the motor 32 and the shaft 22 on which the main driving sprockets 20 are mounted. To prevent the housing which carries some of the differential gearing from turning in a direction opposite to the direction of turning of the pulley 40 (see Fig. 16) a torque rod 303 is pivotally connected to the inner part of the speed reducer housing and, instead of being normally positively anchored to the plate 304 forming a part of the machine frame, is slidable through an opening 306 in said plate 304 but is held in its normal anchoring relation to the speed reducer housing by a spring 308 confined between nuts 310 and the plate 304, nuts 312 on the torque rod 303 below the plate 304 serving to hold said spring 308 in a state of predetermined compression.

With the arrangement just described it will be seen that if there is a jamming of the crate conveyor that is connected to the shaft 22, namely the synchronizing mechanism, the stoppage of the shaft 22 will cause the speed reducer housing to tend to rotate in the reverse direction from the direction of rotation of the pulley 40. This will cause a roller 314 carried upon an arm 316 attached to the housing to move past the buttons on a push button box 318, the roller 314 engaging first a "start" button 320 and then a "stop" button 322 which will shut off the current to the motor 32 and thus stop the driving of the machine. When the jamming or other interference with the rotation of the shaft 22 has been removed the spring 308 will act to rotate the reduction gear housing back to its normal position shown in Fig. 16 which will carry the roller 314 back over the starting button 320 and thus start again the motor 32.

In Fig. 14 is shown switch mechanism for stopping the machine in the event that there are no bottles on the accumulating table to be picked up by the tongs. This mechanism comprises a switch box 324 having a switch arm 326 normally spring pressed into the path of travel of the bottles in the row behind the row that has been accumulated for picking up by the tongs. When the arm 326 is swung out into its dotted line position in Fig. 14 the switch in the box 324 will be opened and the current supply to the motor 32 will be cut off. When, however, as shown in Fig. 14 in full lines, the switch is held in its full line position by the bottles of the second row, the switch will be closed and the current will be supplied to the motor 32 to operate the machine. The arm 326 is made of such shape and size that it will bridge over the small space between the corner of the bottles but will operate if there are no bottles there. Further to the left there are two more switches 328 and 330, both alike, whose function is to prevent accumulation of too many bottles. Their levers 332 and 334 are urged by means of springs to project into the path of the bottles. These switches are normally closed when the levers are in their idle position. Moreover, these switches are connected in multiple to each other, so that when a bottle travels past them it operates them one at a time and thus does not open the circuit, but when bottles accumulate and both the switches are opened then the circuit is opened, which stops the machine that supplies the bottles or containers but does not stop the conveyors 152 and 154 which feed the accumulated bottles to the casing machine of my invention. When the accumulated bottles are moved out of the way of the switches 328 and 330 the circuit is closed and the machine supplying the bottles starts again.

The conveyors 152 and 154 are connected to the filling or capping machine that supplies the bottles and to the casing machine of my invention by means of ratchets or free wheeling couplings so that when the filling machine is stopped by the switches 328 and 330 the bottle conveyors are driven by the casing machine of my invention, and conversely when the casing machine of my invention is stopped by the switchh 324 the conveyors are driven by the filling or capping machine supplying the bottles. The machines supplying the bottles are beyond the scope of my invention but the bottle conveyor and the method of driving them as well as the electric protective devices are within the scope of my invention.

In like manner similar switches are used, in connection with the machine of my invention shown on Figs. 1 and 2, to control the casing machine, if there are no containers at the pick-up station or to control the filling machine if there are too many containers and the conveyor has been filled solid.

Another safeguard is to connect the casing machine of my invention by means of an electrically operated clutch to the filling machine supplying the containers or bottles so that the two machines will work in unison until the filling machine idles, then the switch 324 can open the clutch or ring a bell for the operator to open the coupling and stop the machine of my invention until containers or bottles come along. But, there will never be an oversupply of containers or bottles with the direct connection coupling arrangement.

In Fig. 1 there is shown a roller or flap 336 suspended in the path of the oncoming cases or crates 146. When held in its position shown in Fig. 1 it closes a circuit switch and, therefore, when there is no case or crate against the rising rollers 124 of the synchronizing chains 122 the roller or flap comes to its lower position, opens the electric circuit and stops the machine of my invention as well as the source of bottles or containers until cases or crates are brought into position by the independently powered conveyor chain 116. Then the roller or flap 336 is raised to the position shown in Fig. 1, the switch is again closed and the casing machine and the machine supplying the bottles or containers again operate. Moreover, if for some reason the cases or crates hook together and the case under the roller or flap 336 rises up the roller or flap is raised to a still higher position in which it also opens the switch which again stops the casing machine of my invention and the machine supplying the bottles or containers and an auxiliary circuit is also closed which rings a bell for the attention of the operator to correct the trouble.

Another switch 338 is also shown in Fig. 1 which guards against the rare possibility of the case 146 not advancing to the position 146'. This switch is identical to the switch 324 discussed before in connection with Fig. 14, operating in like manner to shut the power off and stop the casing machine of my invention if there is no case engaged by the rollers 124, but it also rings a bell for the operator to correct the trouble.

It is understood that the protective switches mentioned above may be substituted by compressed air or hydraulic valves to perform the same functions, if preferred.

Although the tracks 218 and 220 for supporting the sprocket chains 18 are not shown in the views illustrating the form of the invention employed in packaging containers, for the sake of clarity of illustration of the other parts it will be understood that these elements can equally be employed with that form of the invention if it is found desirable to do so.

When the machine is operating to lift a casewide group of four containers which have been brought into immediate contact with each other by reason of the stoppage of their movement on the conveyor, it will be apparent that the next container in the line is in frictional engagement with the fourth container of the group being operated upon and that therefore when the group is moved transversely to the line of containers this friction might in some cases be sufficient to tend to tilt this fifth container laterally and possibly one or two succeeding containers. To avoid this, as shown in Figs. 1, 2 and 7, a "guard rail" so labeled on these figures is provided, the end of which stops just short of the point where the face of the fourth container of the group being lifted abuts the face of the fifth container in the line. This "guard rail" serves to prevent any lateral tilting of the containers that are not being lifted.

I claim:

1. Container pick-up and carrying means for the purposes set forth comprising tongs of the lever-grip type, endless parallel conveyors between which said tongs are carried in self-closing free suspension, the suspension support for each pair of tongs comprising a pivot rod extending between said conveyors and from which links, pivotally connected to the respective jaw levers of the tongs, suspend said jaw levers, means for presenting the container to be cased at a pick-up point in the path of travel of said tongs, and means acting upon the jaws of the tongs in advance of their arrival at the pick-up point for effecting a relative lifting movement of said tongs toward their point of suspension to cause the jaws to open to permit them to come into embracing relation to the container as they arrive at the pick-up point.

2. Container pick-up and carrying means according to claim 1 in which extensions on the jaws beyond the container engaging parts thereof cooperate with the jaw opening means.

3. Container pick-up and carrying means according to claim 1 in which the jaws of the tongs are of a width sufficient to grasp a case-wide group of containers and the container presenting means are constructed and arranged to present a case-wide group of containers at the pick-up point.

4. Container pick-up and carrying means for the purpose set forth comprising tongs for embracing and picking up the containers, endless conveyors between which said tongs are carried, means for presenting a container to be cased at a pick-up point in the path of travel of said tongs and means acting upon the jaws of the tongs in advance of their arrival at the pick-up point for causing the jaws to open to permit them to come into embracing relation to the container as they arrive at the pick-up point, the endless conveyors travelling to and away from the pick-up point in reversed substantially parallel paths about supporting wheels and the tongs being suspended from the conveyors in such offset relation thereto that the to and fro path of travel of the axis of suspension of the tongs takes place in a plane which includes the axis of rotation of the conveyor supporting wheels.

5. Container pick-up and carrying means according to claim 4 in which the supporting wheels about which the endless conveyors travel at the pick-up point are of relatively small diameter, whereby the tongs offset can also be relatively small.

6. Container pick-up and carrying means for the purpose set forth comprising tongs for embracing and picking up the containers, endless conveyors between which said tongs are carried, means for presenting a container to be cased at a pick-up point in the path of travel of said tongs and means acting upon the jaws of the tongs in advance of their arrival at the pick-up point for causing the jaws to open to permit them to come into embracing relation to the container as they arrive at the pick-up point, the endless conveyors operating continuously to carry the tongs-supported containers through an inclined path to a discharge point, and means for continuously moving crates successively into container receiving position including means for so synchronizing the continuous crate movement past said discharge point to the continuous movement of the successive container supporting tongs to the discharge point as to insure deposit of each succeeding container in the crate in predetermined relation to the immediately preceding container.

7. Container pick-up and carrying means according to claim 6 in which an endless crate conveyor tends to move the crates past the container receiving position at greater than cooperative speed and means for synchronizing the crate movement to the tongs movement comprise means for engaging and retarding the movements of the individual crates with said crate conveyor while passing said container receiving position.

8. Container pick-up and carrying means according to claim 6 in which jaw opening means adjacent to the discharge point act to effect a relative lifting movement of said tongs toward their point of suspension to open the jaws of the tongs as they arrive at the discharge point.

9. Container pick-up and carrying means according to claim 8 in which the jaws have extensions beyond the container engaging part thereof and wedging means adjacent to the discharge point engage and spread said extensions.

10. Container pick-up and carrying means according to claim 8 in which a support for the tongs, arranged to exert its supporting action thereon between the point of suspension and the jaw pivot after the jaws have reached the point of discharge, prevents downward and closing movement of the jaws after disengagement from the jaw opening means.

11. Container pick-up and carrying means according to claim 1 in which the jaw opening means comprise two pivoted wedge blocks each having its center of gravity so located in respect to the pivot that they normally gravitate into their jaw-opening position and in which extensions on the jaws engage said wedge blocks as the jaws move into pick-up position to effect the opening of said jaws.

12. Container pick-up and carrying means according to claim 11 in which the wedge blocks are provided with shoulders over which the jaw extensions pass and with which said jaw extensions cooperate to rock the wedge blocks into non-jaw spreading relation to each other to permit engagement of the jaws with the container on the pick-up movement of said jaws.

13. Container pick-up and carrying means according to claim 1 in which the endless conveyors carry the tongs-supported containers through an inclined path to a discharge point for discharge into a crate and in which means for leading the container into the crate is movable into lead-in realtion to the container as the container reaches the crate, said lead-in means comprising a counterbalanced lead-in flag and means associated with the tongs for moving said flag against its counterbalance into lead-in position.

14. Container pick-up and carrying means according to claim 13 in which means carried by the counterbalanced flag support and engaging the endless conveyors accelerates the return movement of said lead-in flag to its inoperative position.

15. Container pick-up and carrying means for the purposes set forth comprising tongs for embracing and picking up the containers, endless conveyors between which said tongs are carried, means for presenting a container to be cased at a pick-up point in the path of travel of said tongs and means acting upon the jaws of the tongs in advance of their arrival at the pick-up point for causing the jaws to open to permit them to come into embracing relation to the container as they arrive at the pick-up point, the endless conveyors being arranged to travel to and away from the pick-up point in reversed substantially parallel paths about supporting wheels and the tongs being suspended from the conveyors in such offset relation thereto that the to and fro path of travel of the axis of suspension of the tongs takes place in a plane which includes the axis of rotation of the conveyor supporting wheels.

16. Container pick-up and carrying means according to claim 7, in which the individual crate engaging and retarding means include spacers entering between successive crates and traveling with the crates past the container discharge point.

17. Container pick-up and carrying means according to claim 7 in which the individual crate engaging and retarding means include a second shorter endless conveyor straddling the first-mentioned crate conveyor and carrying crate spacers into and along the path of travel of the crates on said first mentioned conveyor.

References Cited in the file of this patent

UNITED STATES PATENTS

| Number | Name | Date |
| --- | --- | --- |
| 868,741 | Wendt | Oct. 22, 1907 |
| 1,132,713 | Francisco | Mar. 23, 1915 |
| 1,742,074 | Hires | Dec. 31, 1929 |
| 2,036,421 | Luckie | Apr. 7, 1936 |
| 2,119,767 | Anderson | June 7, 1938 |
| 2,213,774 | Taylor | Sept. 3, 1940 |
| 2,277,688 | Cattonar et al. | Mar. 31, 1942 |
| 2,431,265 | Madsen et al. | Nov. 18, 1947 |
| 2,478,034 | Zademach et al. | Aug. 2, 1949 |